(12) United States Patent
Schmid et al.

(10) Patent No.: US 8,557,403 B2
(45) Date of Patent: Oct. 15, 2013

(54) METHOD AND MEANS FOR MAGNETICALLY TRANSFERRING INDICIA TO A COATING COMPOSITION APPLIED ON A SUBSTRATE

(75) Inventors: Mathieu Schmid, Lausanne (CH); Claude-Alain Despland, Prilly (CH); Pierre Degott, Crissier (CH); Edgar Muller, Fribourg (CH)

(73) Assignee: SICPA Holding S.A., Prilly (CH)

( * ) Notice: Subject to any disclaimer, the term of this patent is extended or adjusted under 35 U.S.C. 154(b) by 1065 days.

(21) Appl. No.: 11/917,945

(22) PCT Filed: Sep. 18, 2007

(86) PCT No.: PCT/EP2007/059818
§ 371 (c)(1),
(2), (4) Date: Jan. 23, 2009

(87) PCT Pub. No.: WO2008/046702
PCT Pub. Date: Apr. 24, 2008

(65) Prior Publication Data
US 2010/0040845 A1 Feb. 18, 2010

(30) Foreign Application Priority Data

Oct. 17, 2006 (EP) .................................... 06122467

(51) Int. Cl.
*B32B 15/04* (2006.01)
(52) U.S. Cl.
USPC ............... 428/693.1; 428/206; 428/195.1; 428/900; 428/916; 101/389.1
(58) Field of Classification Search
None
See application file for complete search history.

(56) References Cited

U.S. PATENT DOCUMENTS

| | | |
|---|---|---|
| 3,676,273 A | 7/1972 | Graves |
| 3,791,864 A | 2/1974 | Steingroever |
| 4,705,300 A | 11/1987 | Berning et al. |
| 4,705,356 A | 11/1987 | Berning et al. |
| 4,721,217 A | 1/1988 | Phillips et al. |
| 4,779,898 A | 10/1988 | Berning et al. |
| 4,838,648 A | 6/1989 | Phillips et al. |
| 4,930,866 A | 6/1990 | Berning et al. |
| 5,084,351 A | 1/1992 | Philips et al. |
| 5,607,504 A | 3/1997 | Schmid et al. |
| 5,624,486 A | 4/1997 | Schmid et al. |

(Continued)

FOREIGN PATENT DOCUMENTS

| | | |
|---|---|---|
| EP | 227423 | 6/1992 |
| EP | 406667 | 1/1995 |

(Continued)

*Primary Examiner* — Holly Rickman
*Assistant Examiner* — Lisa Chau
(74) *Attorney, Agent, or Firm* — Greenblum & Bernstein, P.L.C.

(57) ABSTRACT

The invention concerns a device for magnetically transferring indicia, such as a design or an image, to a wet coating layer applied on a substrate, such as a sheet or a web, wherein the said coating layer comprises at least one type of magnetic or magnetizable particles; said device comprising a) at least one magnetized permanent-magnetic plate (2) carrying relief, engravings or cut-outs, mounted such that its relief surface remains accessible, b) at least one additional magnet (3), disposed below said at least one permanent-magnetic plate, facing the surface of the magnetic plate which is opposite to the relief, engraving or cut-out, and c) a holder (1), which has the mechanical function to hold the pieces together in fixed positions. A method for producing the device, the use of the device, and magnetically induced designs obtained with the device, which are useful for protecting currency, value—and identity documents, are disclosed as well.

12 Claims, 9 Drawing Sheets

(56) References Cited

U.S. PATENT DOCUMENTS

Figure 1:
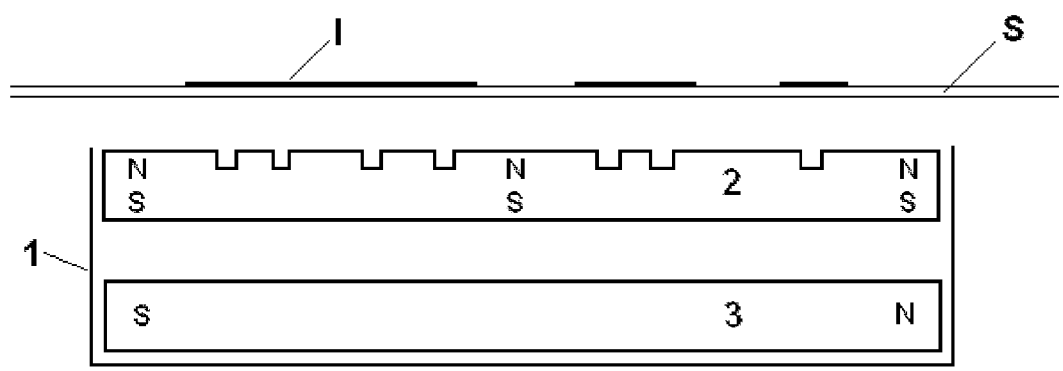

| | | |
|---|---|---|
| 5,807,497 A | 9/1998 | Gailberger et al. |
| 5,824,733 A | 10/1998 | Dobert et al. |
| 2006/0150854 A1* | 7/2006 | Benninger et al. ............ 101/489 |

FOREIGN PATENT DOCUMENTS

| | | |
|---|---|---|
| EP | 686675 | 12/1995 |
| EP | 710508 | 5/1996 |
| EP | 556449 | 3/1997 |
| EP | 1854852 | 11/2007 |
| WO | 92/06445 | 4/1992 |
| WO | 02/73250 | 9/2002 |
| WO | 02/90002 | 11/2002 |
| WO | 03/000801 | 1/2003 |
| WO | 2004/007095 | 1/2004 |
| WO | 2004/007096 | 1/2004 |
| WO | WO 2004007095 A2 * | 1/2004 |
| WO | 2005/002866 | 1/2005 |

* cited by examiner a)
PRIOR ART b)

a) prior art b) present invention a) PRIOR ART b)

METHOD AND MEANS FOR MAGNETICALLY TRANSFERRING INDICIA TO A COATING COMPOSITION APPLIED ON A SUBSTRATE

The invention is in the field of security document printing. It concerns improvements to a device for the transferring of a security design into a magnetic ink layer, in particular a color-shifting magnetic ink layer.

Markings exhibiting viewing-angle dependent color effects ("optically variable devices", OVDs) are used as an efficient anti-copy means on bank notes and security documents. Among the OVDs, optically variable inks (OVI®; EP 227,423 B1) have acquired a preeminent position since their first introduction on currency back in 1987. Optically variable inks are formulated on the basis of optically variable pigment (OVP), a preferred type of OVP being the thin-film optical interference flakes described in U.S. Pat. No. 4,705,300; U.S. Pat. No. 4,705,356; U.S. Pat. No. 4,721,217; U.S. Pat. No. 4,779,898; U.S. Pat. No. 4,930,866; U.S. Pat. No. 5,084,351 and in related disclosures. Other useful types of OVP comprise the multiply coated particles described in U.S. Pat. No. 5,624,486 and U.S. Pat. No. 5,607,504, and the thin film cholesteric (i.e. chiral-nematic) liquid crystal pigments described in U.S. Pat. No. 5,807,497 and U.S. Pat. No. 5,824,733.

Optically variable printed features on security documents, e.g. bank notes, are primarily aimed for the authentication of the document by the unaided human eye, through an examination of the optically variable feature's color at two or more different angles of view, i.e. at least at a near-orthogonal and at a near-grazing view. Said angle-dependent color is a simple message of authenticity, which cannot be reproduced by photocopying machines, and which can rapidly and easily be checked by the man on the street.

In a previous disclosure, published as WO 2005/002866 A1, included herein by reference, applicant proposed an improvement to optically variable printed security elements, which consists in a specific, high-resolution orientation of magnetic optically variable pigment particles in a coating layer in the printing process, using a particular magnetic orientation device.

Magnetic optically variable pigments which can be used for this purpose have been disclosed in U.S. Pat. No. 4,838,648; in EP 686,675 B1; as well as, preferably, in WO 02/73250 A2 and in WO 03/00801 A2.

Methods and devices for the orientation of magnetic particles in coating layers have been disclosed in U.S. Pat. No. 3,676,273; U.S. Pat. No. 3,791,864; EP 406,667 B1; EP 556,449 B1; EP 710,508 A1; WO 02/90002 A2; none of these documents, however, gives an indication to the skilled man about how a high-resolution magnetic orientation pattern can be transferred into a magnetic coating layer in a high-speed printing process.

The applications WO 2004/007095 A2,A3 and WO 2004/007096 A2,A3 disclose the orientation of magnetic pigment flakes in a coating layer, to produce esthetically appealing, bright optically variable designs, which, albeit flat, show a smooth variation of color and reflectivity, reminiscent of a 3-dimensional object. These coatings and the related effects can be obtained in a high-speed printing process. A drawback of these methods and devices is, however, that they do not allow for the transfer of a high-resolution design into the magnetic coating layer.

The device of WO 2005/002866 A1, on the other hand, allows to transfer a high-resolution magnetic orientation pattern into an optically variable magnetic coating layer. A major drawback therein is, however, the lacking esthetics of the resulting image, which has a dull visual appearance. This is a direct consequence of the perpendicular orientation of the magnetic pigment flakes, with respect to the printed substrate plane, over a large part of the oriented coating layer, as resulting from the perpendicular magnetization which is required in the said magnetic orientation device.

The technical problem of orienting plate-like magnetic pigment particles in a coating layer, so that the resulting design exhibits highly resolved, sharp features, as well as a bright overall appearance, has not been resolved up to now.

A need therefore exists for an improved magnetic orientation device, which allows for the transfer of bright and high-resolution designs or images, through the magnetic orientation of pigment particles, into an optically variable magnetic coating layer. The device should furthermore be reliable, easy to implement, and able to function at high printing speed.

The stated technical problem is solved, according to the independent claims, by a combination of a magnetic plate having surface relief, engravings or cut-outs with additional magnetic elements. The present invention furthermore addresses the problem of realizing customer-specific high-resolution magnetic designs on a printed article in an easy-to-implement and highly reliable way.

In the context of the present disclosure, the term 'magnetic' refers to a material which is itself a source of a magnetic field. The term 'magnetizable' refers to a material which reacts to a magnetic field, without being a source of it.

The magnetic orientation device of the present invention comprises at least one permanent-magnetic plate, having an accessible surface carrying a relief, engravings or cut-outs, such as disclosed in WO 2005/002866 A1, and at least one additional magnet, which may be a permanent magnet or an electromagnet, disposed underneath the said relief magnetic plate or plates, i.e. facing the magnetic plate's surface which is opposed to the relief surface, e.g. such as schematically depicted in FIG. 1. The at least one magnetic plate and the at least one additional magnet or magnets are mechanically fixed in a holder.

The said relief permanent-magnetic plate is herein magnetized in a direction which is approximately perpendicular to the relief surface, and the said relief causes local perturbations of its magnetic field, such as disclosed in WO 2005/002866 A1. The relief surface may furthermore be flat or curved. The said additional magnet or magnets can have the same or different magnetization directions, which may coincide or not with the magnetization direction of the relief magnetic plate. As stated before, the permanent-magnetic plate may carry a relief, an engraving or cut-outs, or combinations thereof. A cut-out magnetic plate can be seen as an extreme variant of an engraving, wherein the depth of engraving equals the thickness of the plate. As is understood by the skilled man, a cut-out magnetic plate may need to be mounted on a support, in order to maintain the mutual arrangement of its different parts. The relief plate can furthermore be obtained by all methods known to the skilled man, such as material ablation, molding, polymerization, etc.

Inventors have found that, for obtaining the effects of the invention, the relief magnetic plate and the said additional magnet or magnets must in all case be assembled in a "forced way", i.e. in mutual positions which are different from the positions they would adopt by their natural magnetic attraction.

In the context of the present disclosure, a curved surface is defined as a surface which is only curved in a first dimension, and which is not curved in a second dimension perpendicular to the said first dimension. Approximately perpendicular is to be understood as not deviating more than 30° from the normal direction to the surface.

The magnetic orientation device comprises thus a) at least one magnetized permanent-magnetic plate (2) carrying relief, engravings or cut-outs, mounted such that its relief surface remains accessible, b) at least one additional magnet (3), disposed below said at least one permanent-magnetic plate, facing the surface of the magnetic plate which is opposite to the relief, and c) a holder (1), which has the mechanical function to hold the pieces together in fixed positions.

The said at least one additional magnet may be of a permanent magnetic material, such as cobalt, iron and their alloys, chromium dioxide, generic magnetic oxide spinels, generic magnetic garnets, generic magnetic ferrites including the hexaferrites such as calcium-, strontium-, and barium-hexaferrite ($CaFe_{12}O_{19}$, $SrFe_{12}O_{19}$, $BaFe_{12}O_{19}$, respectively), generic alnico alloys, generic samarium-cobalt (SmCo) alloys, and generic rare-earth-iron-boron alloys (such as NdFeB), as well as the permanent-magnetic chemical derivatives thereof (such as indicated by the term generic) and mixtures including them. It may further be of a polymer-bonded composite magnetic material. Further to this, the magnet may be embodied as an electromagnet, comprising an electric current coil, such as known to the skilled man.

The magnet may also comprise auxiliary magnetizable material, which is present to guide the magnetic field. In case of an electromagnet, the magnetizable material may be an iron core or the like, whose poles are shaped to the desired form and size.

The said at least one additional magnet is magnetized either perpendicular to, or, alternatively, along the magnetization direction of the said relief magnetic plate, or, in case, even along any arbitrary magnetization direction, depending on the technical requirements imposed by a particular magnetic design.

The said at least one additional magnet can also be embodied by a plurality of magnets, having aligned magnetization, mutually opposed magnetization, arbitrary magnetization or any combination thereof.

The magnetic orientation device according to the present invention can be used to produce magnetically induced images (indicia) in coatings comprising magnetic or magnetizable particles, preferably magnetic optically variable pigments.

The process of assembling the magnetic orientation device of the present invention comprises the commutable steps of a) fixing at least one magnetized permanent-magnetic plate (2), carrying surface relief, engravings or cut-outs, in a holder (1) such that its relief surface remains accessible, and b) fixing at least one additional magnet (3) in said holder (1) such that it faces the surface of the magnetic plate which is opposite to the relief, and that the mutual positions of magnet and plate are different from the positions they would adopt by their natural magnetic interaction.

The magnetic orientation device can be part of a printing machine or of other industrial equipment; in particular it can be mounted on a rotating cylinder, in order to allow for high-speed serial operation in sheet fed or continuous roll-to-roll printing processes.

The process of producing a magnetically oriented design or image comprises the sequential steps of a) applying a coating layer (I) onto a first surface of a flat substrate or web (S), said coating comprising magnetized or magnetizable particles; b) while the coating is wet, exposing the coating to the relief surface of the magnetic orientation device according to the present invention, hereby orienting the magnetic or magnetizable particles in the coating; c) hardening the oriented coating layer, hereby permanently fixing the magnetically induced image; wherein said exposing is performed by bringing said coating into close proximity of said relief surface, or by bringing a second surface of the substrate (S), opposite to the said first surface carrying said coating, into contact with said relief surface.

A wet coating, in the context of the present disclosure, means a coating composition, applied to a substrate in a pasty or liquid form, which is not yet hardened or cured.

The coating can be applied to the substrate as known by the skilled man, e.g. by screen-printing, rotogravure printing, flexographic printing, intaglio printing, bar coating, and by still other coating processes, using the corresponding inks. The preferred application method is screen-printing, using particularly designed inks, which are disclosed in a co-pending application of the same applicant, EP06113891.3 (Dec. 5, 2006).

The hardening (curing) step can be performed as known to the skilled man, e.g. through physical drying (evaporation of solvent), UV-curing, electron beam curing, heat-set, oxypolymerization, by combinations thereof, or still by other curing mechanisms. Preferred in the context of the present invention is curing by UV-irradiation, which is rapid and inexpensive.

The magnetically oriented design produced according to the present invention in a coating layer comprising magnetic or magnetizable particles, preferably optically variable magnetic pigment particles, can be used as a security element on bank notes, value documents, identity documents, cards, tax stamps and the like, as well as for product security applications.

Exemplary embodiments of the preferred optically variable pigments are those of the 5-layer type described in U.S. Pat. No. 4,838,648, e.g. $Cr/MgF_2/M/MgF_2/Cr$, or of the 7-layer type described in WO 02/73250, e.g. $Cr/MgF_2/Al/M/Al/MgF_2/Cr$, as known to the skilled man. Herein, 'M' stands for a magnetic material. The metal/dielectric/metal ($Cr/MgF_2/M$, respectively $Cr/MgF_2/Al$) Fabry-Pérot stacks provide for color and angle-dependent color shift, and the magnetic central layer (M) provides for the magnetic properties.

In consequence, a Security element for the protection of bank notes, value documents, identity documents, cards, tax stamps, labels, windows, foils, threads, carrying a magnetically oriented design or image produced according to the present invention is claimed as well.

Furthermore, a security document such as a bank note, a value document, an identity document, a card, a tax stamp, a label, or a product security application, carrying a magnetically oriented design or image produced according to the present invention is also claimed.

A further advantage of the device according to the present invention is that the indicia to be transferred can be defined at will by an appropriate choice of the relief and the constellation of the underlying magnets. The device can be realized using any mechanically workable permanent-magnetic material, such as permanent-magnetic composite materials, comprising a brittle permanent magnetic powder in a malleable metal- or polymer-matrix. Furthermore, the device can most easily be implemented as an relief in a polymer-bonded body of permanent-magnetic material (Plastoferrite). A further advantage of the device is that it is fully customizable, as to the nature of the relief design and of the additional magnet arrangement.

A polymer-bonded body of magnetic material, in the context of the present disclosure, is a composite material comprising a rubber- or plastic-like polymer as a structural binder, and a permanent-magnetic powder material as an extender or 'filler'. Preferred polymer binders include rubber-type flexible materials such as nitrile rubber, Nordel® (EPDM hydrocarbon rubber), and Natsyn® (poly-isoprene), as well as Nylon 6 (poly-caprolactam), Nylon 12 (poly-laurolactam), polyamide, poly-phenylene sulfide (PPS), epoxy resins, and Hypalon® (chlorosulfonated polyethylene).

Preferred permanent magnetic powder materials include cobalt, iron and their alloys, chromium dioxide, generic magnetic oxide spinels, generic magnetic garnets, generic magnetic ferrites including the hexaferrites such as calcium-, strontium-, and barium-hexaferrite ($CaFe_{12}O_{19}$, $SrFe_{12}O_{19}$, $BaFe_{12}O_{19}$, respectively), generic alnico alloys, generic samarium-cobalt (SmCo) alloys, and generic rare-earth-iron-boron alloys (such as NdFeB), as well as the permanent-magnetic chemical derivatives thereof (such as indicated by the term generic) and mixtures including them. Polymer-bonded bodies of magnetic materials are obtainable from many different sources, such as from Group ARNOLD (Plastiform®) or from Materiali Magnetici, Albairate, Milano, IT (Plastoferrite). Alternatively, specifically engineered polymer/magnet composites can be used.

The said magnetic powder material can either be magnetically isotropic or magnetically anisotropic. In the case of magnetically anisotropic powder materials, the magnetic powder particles are preferably oriented in the matrix or binder so as to determine a preferred direction of magnetization, chosen perpendicular to the extended surface of the magnetic sheet carrying said relief. Isotropic polymer-bonded bodies of magnetic materials, in turn, can be magnetized equally well in all directions.

Bodies of permanent-magnetic composite materials advantageously combine the desirable magnetic properties (high coercivity) of the otherwise brittle and not well workable ferrite, Alnico, rare-earth or still other magnets with the desirable mechanical properties (flexibility, machine-ability, shock-resistance) of a malleable metal or a plastic material.

The body of a magnetic composite material can be obtained in any desired size and form, e.g. as a thin, flexible plate which can be bent and mechanically worked, e.g. cut to size or shape, using commonly available mechanical ablation tools and machines, as well as air or liquid jet ablation, or laser ablation tools. The relief of the body of composite permanent-magnetic material may be achieved by any way and method known in the art, by molding, by hand-engraving, by mechanical engraving machines, as well as by computer-controlled engraving stations which, furthermore, may produce the engraving either with the help of mechanical tools, or with gaseous or liquid jets of abrasives, or through laser-ablation, using e.g. $CO_2$—, Nd—YAG or excimer lasers.

As is understood by the skilled man, the permanent-magnetic plate can also be cut or molded to a particular size and shape, rather than engraved. Holes may be cut out of it, or cut-out pieces may be assembled on a support. Furthermore, it is also understood that there must not be any predetermined size relation between the at least one magnetic plate and the at least one additional magnets underneath.

According to the invention, a sheet- or plate-like body of a composite permanent-magnetic material, preferably an anisotropically oriented one, is engraved or molded and magnetized preferably in a direction substantially perpendicular to the relief surface of the sheet. In the context of the present disclosure, substantially perpendicular means a direction which is not deviating more than 30° from perpendicular direction, and substantially parallel means a direction which is not deviating more than 30° from parallel direction.

According to the invention, user-defined indicia are engraved, cut or molded into at least one surface of the said body of permanent-magnetic composite material. The relief generation can hereby take place either before or after the magnetization operation. The relief must be sufficiently deep, in order to create a significant perturbation of the local magnetic field at the surface. Said perturbation of the local magnetic field, which is due to a local lacking of magnetic material, manifests itself in a downward-bending of the magnetic field lines into the lower parts of the relief, which, in turn, correspondingly orient magnetic particles in a wet coating layer on a printed item, when this layer is brought into sufficient proximity of the device, e.g. placed on top of the relief magnetic device.

The invention can be practiced on any type of imprintable sheet or web material, in particular on the materials used for producing a bank note, a value paper, an official document, a tax excise stamp, a label, a foil, a thread or a decal. The imprintable sheet or web material may further be of paper or of polymer (such as PE, PP or PVC), and it may comprise a single layer, as well as a plurality of layers.

EXEMPLARY EMBODIMENTS

The invention is now further explained with the help of the figures and some exemplary embodiments.

FIG. 1 schematically depicts an embodiment of the device of the invention: a holder (1) comprises a relief magnetic plate (2) having vertical magnetization and an additional magnet (3) having horizontal magnetization.

Figure 2:
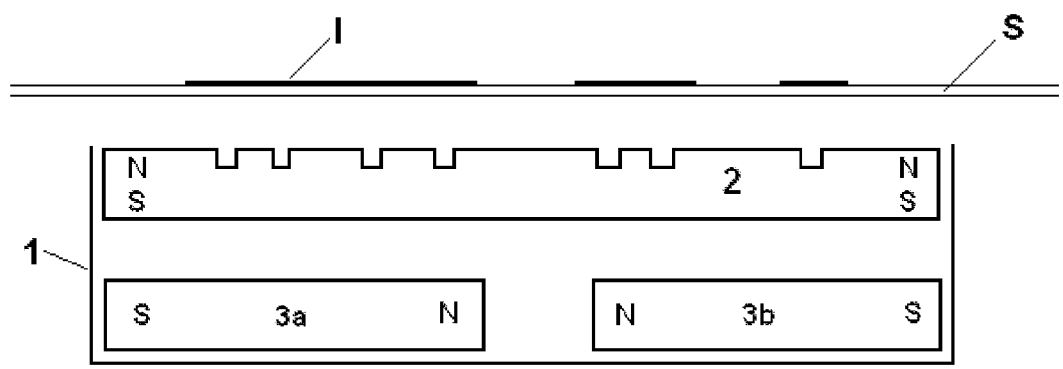

FIG. 2 schematically depicts an alternative embodiment of the device of the invention: the device comprises two additional magnets (3a, 3b) having horizontal magnetization and opposed poles.

Figure 3:
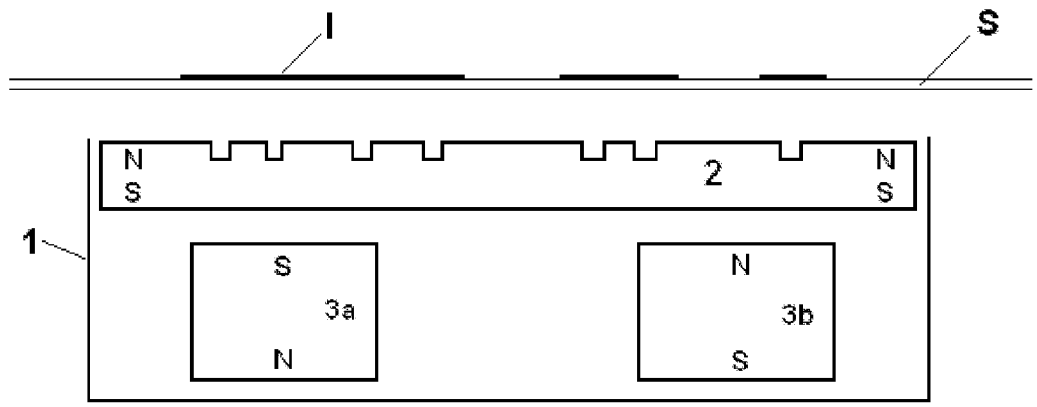

FIG. 3 schematically depicts an alternative embodiment of the device of the invention: the device comprises two additional magnets (3a, 3b) having vertical magnetization and alternating poles.

Figure 4:
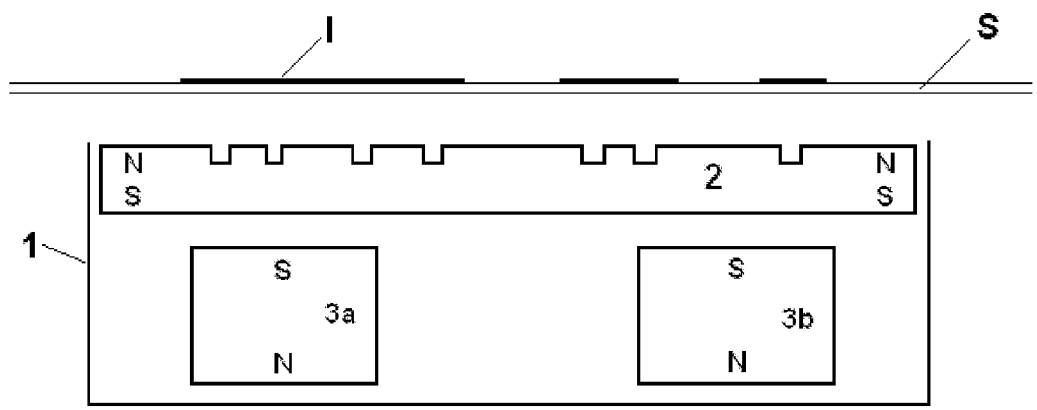

FIG. 4 schematically depicts an alternative embodiment of the device of the invention: the device comprises two additional magnets (3a, 3b) having vertical magnetization and opposed poles; the poles are also opposed to those of the magnetic plate.

Figure 5:
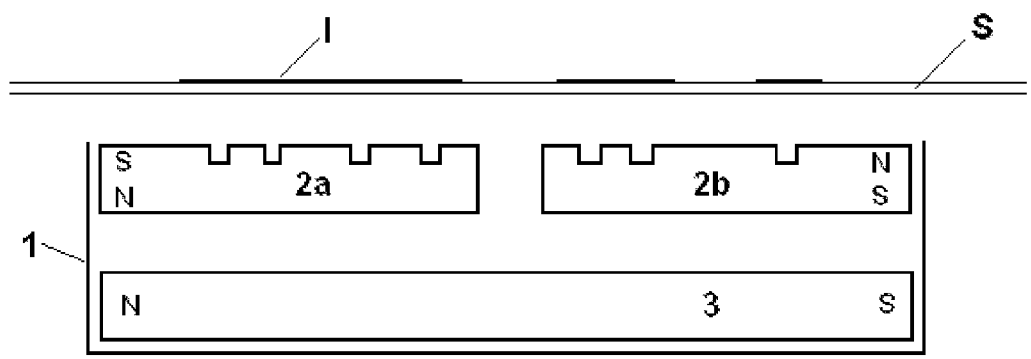

FIG. 5 schematically depicts an alternative embodiment of the device of the invention: the device comprises two relief magnetic plates (2a, 2b) having vertical magnetization and alternating poles and an additional magnet (3) having horizontal magnetization, whose poles are opposed to those of the magnetic plate.

Figure 6:
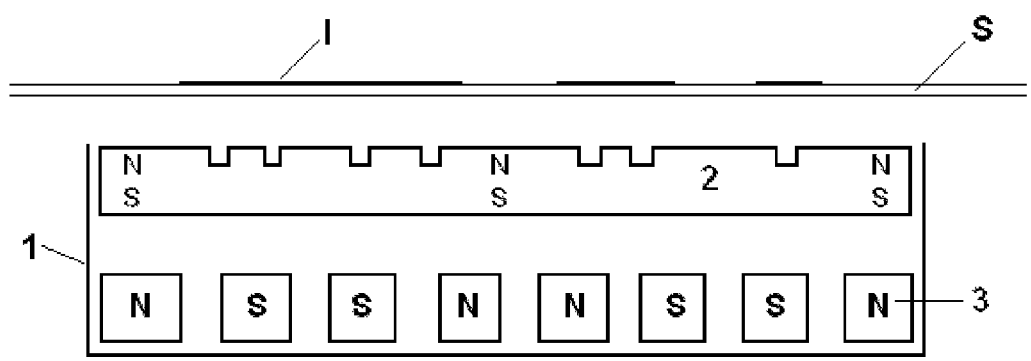

FIG. 6 schematically depicts an alternative embodiment of the device of the invention: the device comprises a manifold of additional magnets (3), disposed along the viewing direction, whose poles are partly opposed.

Figure 7:
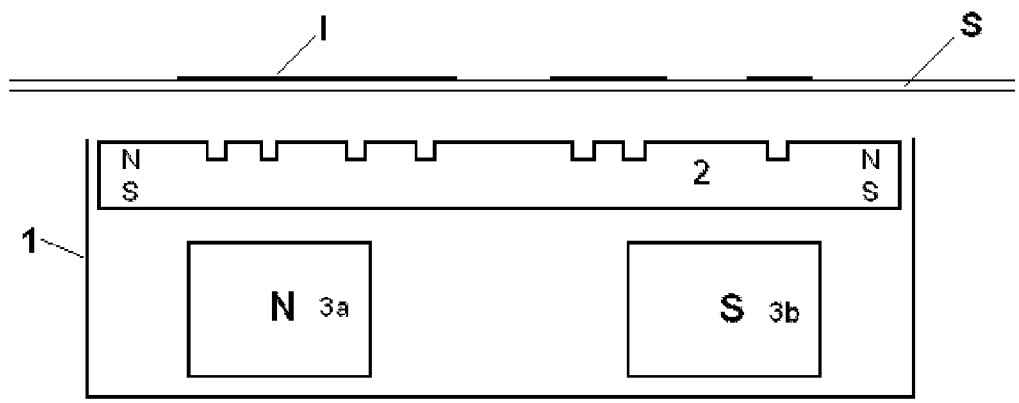

FIG. 7 schematically depicts an alternative embodiment of the device of the invention: the device comprises two additional magnets (3), disposed along the viewing direction, whose poles are aligned.

Figure 8:
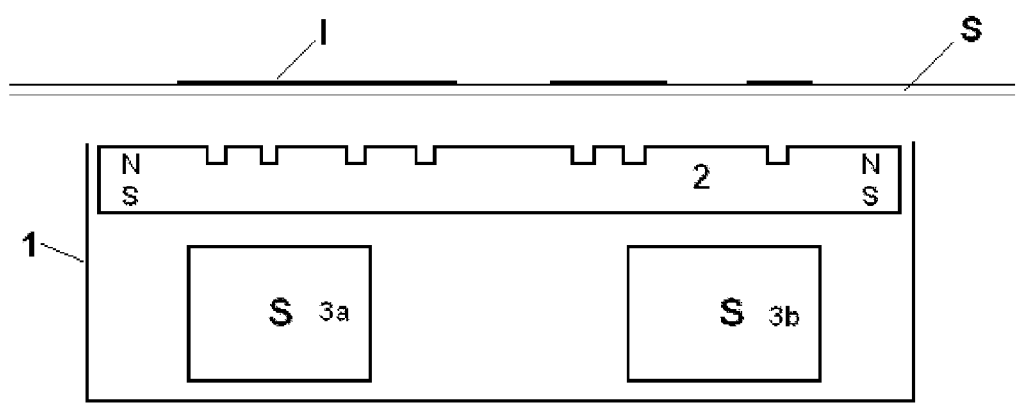

FIG. 8 schematically depicts an alternative embodiment of the device of the invention: the device comprises two additional magnets (3), disposed along the viewing direction, whose poles are opposed.

Figure 9:
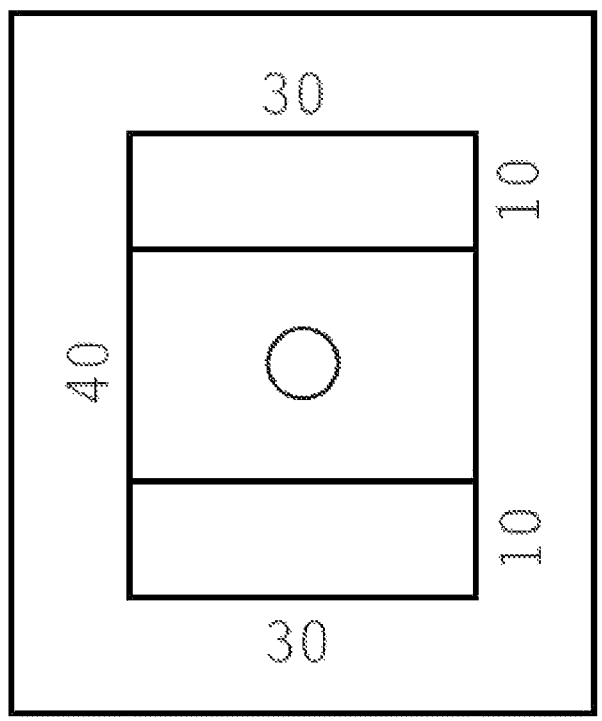

FIG. 9 shows a top view of an embodiment of a holder (1), cut from aluminum and designed to be mounted on a rotating drum of a printing machine. The holder can take up, in a lower plane, two permanent magnets of section 10×30 mm, and in an upper plane, a relief permanent magnetic plate of section 40×30 mm.

Figure 10:
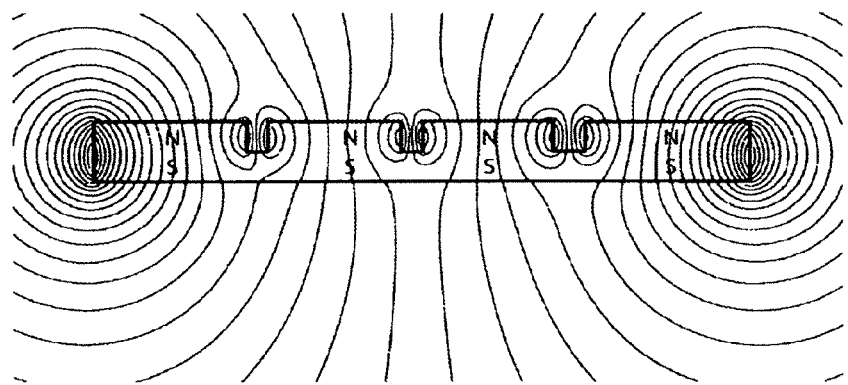
Figure 10:
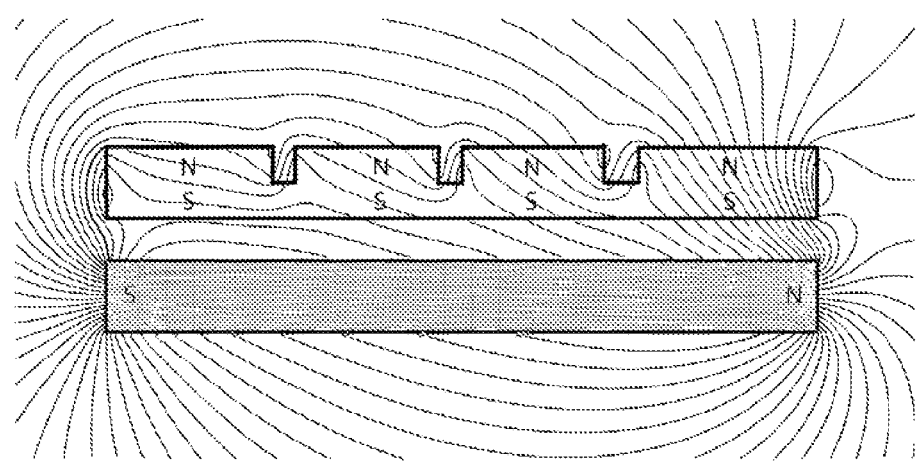

FIG. 10 Calculated magnetic fields: a) in a relief magnetic plate device according to WO 2005/002866 A1; b) in a device combining a relief magnetic plate and an additional magnet according to the present application.

Figure 11:
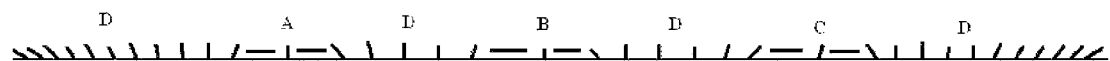
Figure 11:
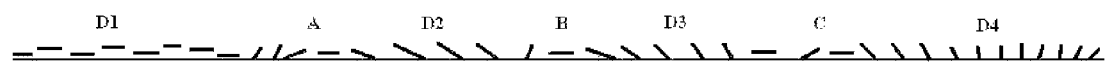

FIG. 11 Schematic drawings of an oriented pattern of magnetic optically variable pigment flakes in a coating layer: a) as obtained with a device according to WO 2005/002866; b) as obtained with a device combining a relief magnetic plate and an additional magnet according to the present invention.

Figure 12:
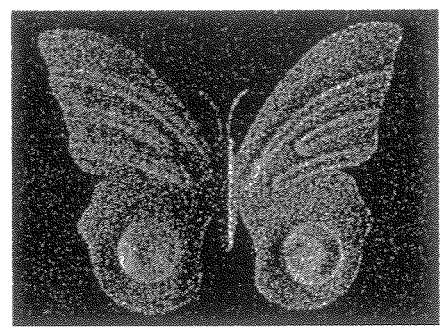
Figure 12:
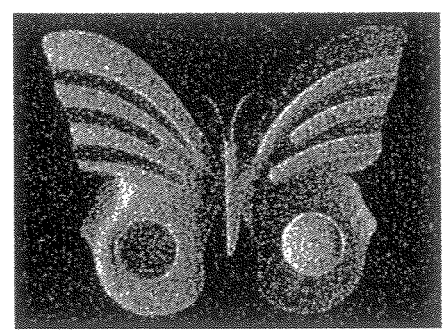

FIG. 12 Reproductions of: a) an image in a magnetic coating layer oriented with a device according to WO 2005/002866; b) an image in a magnetic coating layer oriented with a device combining a relief magnetic plate and an additional magnet according to the present invention.

In an exemplary embodiment, according to FIG. 7, FIG. 8, and with particular reference to FIG. 9, a holder (1) cut out of an aluminum block, is made to contain, in a lower plane, two permanent magnet bars (3a, 3b), 10×10×30 mm, made of $SrFe_{12}O_{19}$ ceramic. These permanent magnets are fixed and held in place by a squeezing mechanism and screws. The poles of the two permanent magnets are arranged either as shown in FIG. 7, or as shown in FIG. 8. On top of the said permanent magnet bars, a relief permanent magnetic plate (2), 40×30×3 mm, made from "Plastoferrite", is disposed and fixed in place, such that the relief remains accessible (i.e. visible from the top).

The plastoferrite plate is engraved with a desired high-resolution pattern, either using a mechanical engraving tool, or, preferably, using an automated $CO_2$— or YAG- laser engraving tool.

The holder (1) is shaped as to fit into the rotating image-transfer cylinder of a sheet-fed, high-speed printing/image transferring machine. An upper surface of the substrate sheet (S) is imprinted in a previous step with an magnetic optically variable ink layer (I), using an optically variable screen printing ink of the type disclosed in the co-pending application EP06113891.3 (Dec. 5, 2006) of the same applicant. While the printed ink layer (I) is still wet, the lower surface of the imprinted sheet (S) is brought in contact with the rotating image-transfer cylinder for half a rotation of the said cylinder.

An illustration of the effect of an additional magnet onto the magnetic field of the relief magnetic plate is given in FIG. 10. FIG. 10a shows the field of a relief magnetic plate according to the prior art (WO 2005/002866). The field lines above the relief are substantially perpendicular to the plate, except at the very edges of the relief. The plate's north pole is at the surface carrying the relief, and its south pole opposite to it. FIG. 10b shows the field of a device comprising the same relief magnetic plate as in FIG. 10a, but having an additional permanent magnet, fixed opposite to the relief surface, so as to have its south pole to the left and its north pole to the right of the picture. The field lines above the relief are substantially parallel to the left of the picture (where the additional magnet's south pole faces the south pole of the relief magnetic plate, producing repulsive interaction), and substantially perpendicular to the right of the picture (where the additional magnet's north pole faces the south pole of the relief magnetic plate, producing attractive interaction). The high-resolution field changes at the relief of the magnetic plate are still present. The flattening of the magnetic field above the plate at the side of repulsive magnetic interaction is clearly illustrated.

FIG. 11 schematically shows, for both above contemplated cases, the resulting magnetic flake orientation in a coating placed above the relief. FIG. 11a schematically depicts the flake orientation resulting from the relief magnetic plate according to the prior art (WO 2005/002866): The high-resolution design of the relief plate appears as narrow zones of horizontal flake orientation (areas A,B,C) in a large background of vertical flake orientation (areas D). These latter optically appear as dull zones. FIG. 11b schematically depicts the flake orientation resulting from a device having the relief magnetic plate combined with an additional magnet, corresponding to FIG. 10b above. The high resolution design of the relief plate still appears as narrow zones of different flake orientation (zones A,B,C); but the background flake orientation now gradually changes from horizontal (zone D1), over progressively inclined (zones D2, D3), to vertical (zone D4), when going from the side of repulsive interaction to the side of attractive interaction between the magnetic plate and the additional magnet.

An illustration of an embodiment of the appealing optical effects which can be produced in a magnetic coating using the device of the present invention, is given in FIG. 12 in comparison with the prior art. FIG. 12a shows the optically variable image of a 'butterfly' logo, as obtained with a device according to the prior art (WO 2005/002866). FIG. 12b shows the appealing optical effects obtained with the same relief magnetic plate, when it is combined with additional magnets to control the direction of the magnetic field.

The present invention thus claims a device for magnetically transferring indicia to a wet coating composition (I) applied as a layer on a substrate (S), such as a sheet or web suitable for coating, the coating composition (I) comprising at least one type of magnetic or magnetizable pigment flakes, said device comprising: at least one magnetized magnetic plate (2) having a first magnetic field and having surface relief, engravings or cut-outs on a surface thereof representing said indicia, and at least one additional magnet (3, 3a, 3b) having a second magnetic field, wherein the additional magnet (3, 3a, 3b) is fixedly positioned adjacent to the magnetic plate (2), so as to produce substantial overlap of their magnetic fields.

Substantial overlap means that the at least one additional magnet produces a contribution of at least 1%, preferably of at least 10% to the total magnetic field at one point of the relief surface of the magnetic plate.

The magnetic plate (2) and the additional magnet (3, 3a, 3b) are preferably arranged such as to produce a magnetic field having an angle of less than 45° to the plane of the said relief surface in at least one surface area not carrying relief.

The magnetic plate (2) is preferably a magnetized permanent-magnetic plate (2) mounted such that its surface (S) remains accessible, and the additional magnet (3) or magnets (3a, 3b) are disposed adjacent, preferably below said permanent-magnetic plate (2), facing the surface of the permanent-magnetic plate which is opposite to the relief, engravings or cut-outs, and the device further comprising fixing means to hold the magnets (3, 3a, 3b) and the plate (2) in their positions, the fixing means comprising preferably a holder (1) and/or adhesive (1a) and/or molded polymeric substrate (1b).

The permanent-magnetic plate (2) carrying a relief, engravings or cut-outs and the additional magnet (3, 3a, 3b) are preferably mounted in positions which hold them against the inherent magnetic forces working between them.

The permanent-magnetic plate (2) carrying relief, engravings or cut-outs is preferably a composite material comprising a polymer as a structural binder, preferably a rubber- or plastic-like polymer, and a permanent-magnetic powder as a filler.

The additional magnet (3) is preferably magnetized substantially perpendicular to the magnetization direction of the permanent-magnetic plate (2), or substantially parallel to the magnetization direction of the permanent-magnetic plate (2).

The said at least one additional magnet (3) comprises preferably a plurality of magnets (3c), having aligned magnetization, mutually opposed magnetization, arbitrary magnetization or a combination thereof.

The device according to the invention can be used for the production of magnetically induced indicia in coatings comprising magnetic or magnetizable particles, preferably magnetic optically variable pigment flakes.

Further claimed is a substrate (S) having at least one coating layer (I), said coating layer (I) comprising at least one type of magnetic or magnetizable pigment flakes, wherein indicia are embodied in the coating layer (I) through a selective orientation of the magnetic or magnetizable pigment flakes by exposure of the wet coating layer (I) to the magnetic field of the above described device, and subsequent hardening or curing the coating layer (I). Preferably, the pigment flakes in at least one area of the coating not carrying indicia are oriented substantially such as to adopt an angle of less than 45° to the plane of the said coating layer (I) in at least one surface area.

The substrate (S) is preferably a security element for the protection of bank notes, value documents, identity documents, cards, tax stamps, labels, windows, foils, threads, products, packaging material, carrying a magnetically oriented design or indicia.

In an alternative embodiment, the substrate (S) is preferably a security document such as a bank note, a value document, an identity document, a card, a tax stamp, a label, or a product, carrying a magnetically oriented design or indicia.

In the substrate (S), preferably more than 50% of the pigment is aligned under an angle of less than 45° to the surface of the substrate (S).

Further claimed is a method for transferring indicia to a substrate (S), such as a sheet or web, comprising the steps of: a) applying a layer of a coating composition (I) to at least a part of a first surface of the substrate (S), the coating composition comprising at least one type of magnetic or magnetizable pigment flakes; b) exposing the coated substrate (S), whilst the coating is wet, to the magnetic field of a device, the device comprising at least one magnetized magnetic plate (2) having a first magnetic field and having surface relief, engravings or cut-outs on a surface thereof representing said indicia, and at least one additional magnet (3, 3a, 3b) having a second magnetic field, wherein the additional magnet (3, 3a, 3b) is fixedly positioned adjacent to the magnetic plate (2), so as to produce substantial overlap of their magnetic fields; c) hardening or curing the coating composition (I), thereby irreversibly fixing the orientation of the oriented magnetic or magnetizable pigment flakes.

In the foregoing method, the magnetic plate (2) and the additional magnet (3, 3a, 3b) are preferably arranged so as to produce a magnetic field having an angle of less than 45° to the plane of the said relief surface in at least one surface area not carrying relief.

In the foregoing method, the step of exposing is preferably chosen from the options of: bringing said coating composition (I) into close proximity with said relief surface of said magnetic plate; and bringing a second surface of the substrate (S), opposite to the said first surface carrying said coating composition (I), into contact with said relief surface of said magnetic plate.

The foregoing method preferably further comprises the step of mounting the fixedly positioned magnetic plate (2) and the additional magnet (3) on a rotatable cylinder on a printing machine.

The magnetically oriented design produced according to any one of claims 13 to 16 can be used as a security element on bank notes, value documents, identity documents, cards, tax stamps, labels, as well as for products.

The invention claimed is:

1. A device for magnetically transferring indicia to a wet coating composition applied as a layer on a substrate, the coating composition comprising magnetic or magnetizable pigment flakes, said device comprising:
    at least one permanent-magnetic plate having a first magnetic field, wherein at least one surface of the permanent-magnetic plate represents said indicia by comprising a relief, engraving or cut-out; and
    at least one additional magnet having a second magnetic field, wherein said at least one additional magnet is fixedly positioned underneath said at least one permanent-magnetic plate, so as to produce substantial overlap of the first and second magnetic fields,
    wherein said at least one permanent-magnetic plate and said at least one additional magnet are mounted in positions which hold them against the inherent magnetic forces working between them.

2. The device according to claim 1, wherein the at least one surface of the permanent-magnetic plate comprising the relief, engraving or cut-out further comprises at least one plane surface area having no relief, engraving or cut-out, and wherein said at least one permanent-magnetic plate and said at least one additional magnet are arranged such as to produce a magnetic field having an angle of less than 45° to the at least one plane surface area of the permanent-magnetic plate having no relief, engraving or cut-out.

3. The device according to claim 1, wherein the at least one permanent-magnetic plate is mounted such that its surface remains accessible, and said at least one additional magnet faces a surface of said at least one permanent-magnetic plate which is opposite to the surface comprising the relief, engraving or cut-out, and the device further comprising a structure to hold the at least one additional magnet and the at least one permanent-magnetic plate in their positions.

4. The device according to claim 3, wherein said structure comprises a holder and/or adhesive and/or molded polymeric substrate.

5. The device according to claim 1, wherein said at least one permanent-magnetic plate is made of a composite material comprising a polymer as a structural binder, and a permanent-magnetic powder as a filler.

6. The device according to claim 5, wherein said polymer is a rubber- or plastic-like polymer.

7. The device according to claim 1, wherein said at least one additional magnet has a magnetization direction which is 90° to 60° to the magnetization direction of said at least one permanent-magnetic plate.

8. The device according to claim 1, wherein said at least one additional magnet comprises a plurality of magnets, having aligned magnetization to each other, mutually opposed magnetization, arbitrary magnetization to each other or a combination thereof.

9. The device according to claim 1, wherein the at least one additional magnet has a magnetization direction which is 0° to 30° to the magnetization direction of said at least one permanent-magnetic plate.

10. The device according to claim 1, wherein the at least one additional magnet produces a contribution of at least 1% to the total magnetic field at one point of the relief surface of the permanent-magnetic plate.

11. The device according to claim 10, wherein the at least one additional magnet produces a contribution of at least 10% to the total magnetic field at one point of the relief surface of the permanent-magnetic plate.

12. The device according to claim 1, wherein the substrate comprises a sheet or web suitable for coating.

* * * * *